D. BASCH.
SYSTEM OF DISTRIBUTION.
APPLICATION FILED MAY 3, 1917.
1,297,780.
Patented Mar. 18, 1919.
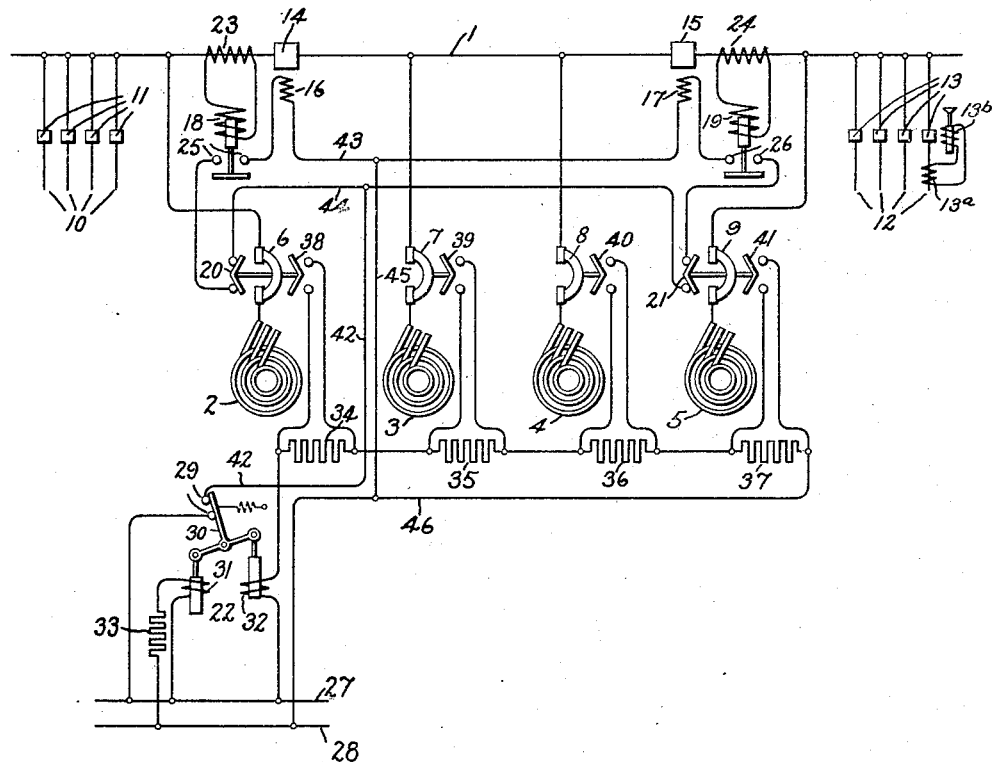
Inventor:
David Basch,
by [signature]
His Attorney.

UNITED STATES PATENT OFFICE.

DAVID BASCH, OF SCHENECTADY, NEW YORK, ASSIGNOR TO GENERAL ELECTRIC COMPANY, A CORPORATION OF NEW YORK.

SYSTEM OF DISTRIBUTION.

1,297,780.   Specification of Letters Patent.   Patented Mar. 18, 1919.

Application filed May 3, 1917. Serial No. 166,159.

*To all whom it may concern:*

Be it known that I, DAVID BASCH, a citizen of the United States, residing at Schenectady, in the county of Schenectady, State of New York, have invented certain new and useful Improvements in Systems of Distribution, of which the following is a specification.

My invention relates to systems of distribution and has for its object to provide means whereby low rupturing capacity switches or circuit breakers may be used to control feeders on systems of comparatively high generator capacity.

In systems of distribution in which a high generator capacity is required to furnish an extensive network comprising a plurality of feeders, a plurality of generators are connected in parallel to supply this network. On such systems it has been the usual practice to connect the various feeders to the common supply bus through oil break switches or circuit breakers of a rupturing capacity substantially equal to the generator capacity of the station, that is, to the energy output of the generators as these switches were required to open their respective feeders in case of trouble, under the full or total generator capacity. In large networks or at the large distribution stations, the generator capacity is usually considerable so that large and expensive circuit breakers have been necessary to control the various feeders of the system, thereby taking up considerable space and increasing the cost of station equipment.

By the use of my invention, I overcome these difficulties by providing means whereby a feeder of a system may be automatically disconnected in case of trouble without opening its circuit breaker under the full generator capacity of the station but only under a limited portion of the generator capacity thus enabling the use of comparatively low rupturing capacity circuit breakers which are smaller, take up less room in the station and are much cheaper. I accomplish this result by using bus section switches which are operatively related to or interlocked with the generator switches in such a way that the section switches are made non-operative when the number of generators is such that the total generator capacity is below the safe rupturing capacity of the feeder switches. When more generators are running than compatible with the rupturing capacity of the feeder switches, then the section switches are made operative and a fault on any feeder will open the section switches to reduce the energy fed to the fault, before the feeder switches open.

The novel features which I believe to be characteristic of my invention will be definitely indicated in the appended claims while the features of construction and mode of operation will be understood by reference to the following description taken in connection with the accompanying drawing which shows the preferred embodiment of my invention and in which the single figure shows diagrammatically a system of distribution embodying the novel features of my invention.

In this figure, I have shown a polyphase system of distribution, for purposes of clearness, in one line diagram, it being understood that the connections for other phases of the system are similar. This system comprises a common supply conductor or bus bar 1 supplied with power, for example, by four generators 2, 3, 4 and 5, connected to the bus in parallel through generator switches 6, 7, 8 and 9, respectively. The bus 1 supplies the distributing network comprising a plurality of feeders connected to the bus in two groups, one group on each side of the generators. Feeders 10 constituting one group are connected to the bus 1 through feeder switches 11 and feeders 12, constituting the other group, are connected to the bus through feeder switches 13, the feeder switches 11 and 12 having a safe rupturing capacity equivalent to, for instance, one-half the generator capacity of the station. These switches 11 and 13 are arranged to be automatically tripped with a time delay and as illustrating this arrangement I have shown for one of the feeders 13, a transformer 13[a] operatively related to a trip coil 13[b] movable with a time limit action. It is understood that similar means is provided for all the switches 11 and 13. In accordance, therefore, with my invention, if a fault develops on any one of the feeders 10 or 12, its feeder switch opens, not under the total generator capacity, or the capacity of the four generators but only under the capacity of, for instance, two generators which enables the use of a switch of much smaller rupturing capacity with a consequent saving in cost.

To accomplish this result, I provide an automatic sectionalizing means connected to the bus 1 in such a relation to the generators that when trouble occurs upon any of the feeders 10 or 12, the generator capacity under which a faulty feeder switch or switches are opened, is within the safe rupturing capacity of the switches, while continuity of service is maintained on the healthy feeders. My sectionalizing means comprises two bus section switches 14 and 15, the switch 14 being connected to the bus 1 between the connections for generators 2 and 3 or in such a manner that upon the opening of the switch 14 the feeders 10 are supplied from only one generator 2, while switch 15 is connected to the bus 1 between the connections for generators 4 and 5 so that upon the opening of switch 15 only one generator, 5, supplies the feeders 12. The bus section switches 14 and 15 are provided with trip coils 16 and 17, respectively, and are of the automatic instantaneous type.

For controlling the trip coils 16 and 17 and thereby the sectionalizing means, I provide a controlling means comprising relay devices 18 and 19, auxiliary switches 20 and 21 and a common electro-responsive device 22. Relay devices 18 and 19 are operatively related to transformers 23 and 24, respectively, which are connected to the bus 1 between feeders 10 and switch 14 and between feeders 12 and switch 15, respectively, and preferably between the connection of generators 2 and 5 to the bus 1 and the bus section switches 14 and 15 respectively. Relays 18 and 19 are operative thereby in response to overload above a predetermined amount on any of the feeders 10 and 12, respectively, to instantaneously close their respective contacts 25 and 26, on the parallel control circuits for the bus section switches 14 and 15 respectively. The auxiliary switches 20 and 21 also control contacts in the control circuits of section switches 14 and 15 respectively and are operative in response to the operation of generator switches 6 and 9, respectively, being closed when the switches 6 and 9 are closed and opened when these switches are opened, to form an interlocking means between the generators and the bus section switches. The control circuits for section switches 14 and 15 are connected to a source of excitation or control buses 27 and 28 through the contacts 29 of the electro-responsive device 22. This electro-responsive device may be of various forms but I prefer to use a relay of the differential or balanced arm type comprising a movable bridging contact 30 carried by a common operating arm movable in response to two coils or windings 31 and 32. These windings are included in parallel circuits, the circuit of winding 31 including a resistance element 33 in series and the circuit of winding 32 including the resistance elements 34, 35, 36, and 37 in series corresponding to each of the generators 2, 3, 4 and 5, respectively. The resistance of elements 34, 35, 36, and 37 are substantially equal and of a value relative to the resistance of element 33 so that the resistance of element 33 is substantially equal to the resistance of any two elements 34, 35, 36 or 37. The resistance elements 34, 35, 36, 37 are normally in the circuit of the coil or winding 32 but are arranged to be short-circuited by switches 38, 39, 40 and 41, respectively, which are operatively related to the generator switches 6, 7, 8 and 9, respectively, so that the opening of any one of the generator switches closes its respective switch 38, 39, 40 or 41 to short-circuit its respective resistance element 34, 35, 36 or 37.

The operation of my device may be described as follows: Under normal operation with generator switches 6, 7, 8 and 9 closed, the four generators 2, 3, 4 and 5 supply the bus 1 which in turn distributes the power to the two sets of feeders 10 and 12. The control circuits for the sectionalizing means or section switches 14 and 15 are closed by the control switches 20 and 21 respectively and by the common electro-responsive device 22, each control circuit being open at the contacts 25 and 26 respectively as the respective relay devices 25 and 26 are normally in circuit opening position. The contacts 29 of the electro-responsive device 22 are closed, and coil 31 of the relay overpowers coil 32, as the circuit of coil 32 includes the resistance elements 34, 35, 36 and 37 in series thus providing a circuit of substantially twice the resistance as the circuit of coil 31 including resistance element 33. The generator switches 6, 7, 8 and 9 are preferably of the non-automatic type while the feeder switches 11 and 13 are of automatic type capable of being tripped with a time limit action. The bus section switches 14 and 15 are, on the other hand, of the automatic instantaneously tripped type. With the four generators running, the circuit is as shown in the drawing and the section switches 14 and 15 are both rendered automatic to open on overload.

Let us assume a fault occurs on a feeder, for instance, one of the feeders 10. The excess or overload current in the faulty feeder causes an excess current to flow through transformer 23 which operates the relay 18 to instantly close its contacts 25. The control circuit for feeder switch 14 or the circuit of the trip coil 16 is thereby completed from the control bus 27 through contacts 29, closed by the electro-responsive device 22, and thence along conductors 42 and 44, through auxiliary switch 20, contacts 25, closed by relay 18, through trip coil 16, and along conductors 43, 45 and 46 to the control bus 28. The section switch 14 is thereby instantaneously opened and cuts off generators 3, 4 and 5 from supplying the feeders 10 and allows generator 2 alone to supply the load of feeders 10. After the time interval required for trip device 13^b for the feeder switch 11 to operate corresponding to the faulty feeder if the fault still exists, that switch 11 opens to disconnect its feeder under the capacity of but one generator, namely generator 2. It is thus apparent that section switch 15 is non-operative as an overload, under these conditions, will not cause an operation of relay 19, consequently all the feeders 12 are maintained in service supplied by generators 3, 4 and 5 and all the feeders 10 except the one at fault are also maintained in service, while the feeder at fault is selected and its circuit opened within the safe rupturing capacity of its switch which is relatively small compared with the total generated capacity. In a similar manner a fault on any one of the feeders 12 would cause bus section switch 15 to open instantaneously to permit that feeder switch 13 corresponding to the faulty feeder to open after its time interval under the capacity of one generator, namely 5.

If a heavy overload current exists due, for instance, to a dead short-circuit on any of the feeders 10 or 12, the excess current on bus 1 causes both transformers 23 and 24 to operate their relays 18 and 19 and the control circuits for both section switches 14 and 15 are completed to energize both trip coils 16 and 17 and instantaneously open both switches 14 and 15. When switches 14 and 15 both open, the generators 3 and 4 are cut off from supplying the feeders and run idle while generator 1 supplies the load of feeders 10 and generator 5 supplies the load of feeders 12. During these operations just described the electro-responsive device 22 remains in circuit closing position as none of the generators have been disconnected and the operating conditions relative to the electro-responsive device have not changed.

Let us assume that, for some reason, generator 2 is not running, then its generator switch 6 is open and auxiliary switch 20 is open and switch 38 closed. The closure of switch 38 short-circuits the resistance element 34 corresponding to generator 2 and the opening of switch 20 opens the control circuit for bus section switch 14 thereby rendering the switch non-automatic or non-operative, as the control circuit including its trip coil 16 cannot be completed as long as switch 20 is open. Section switch 15, however, is still automatic. In a similar manner, if generator 5 is not running, section switch 15 is rendered non-automatic and switch 14 is automatic. In either case we have three generators supplying the feeders 10 and 12 with one section switch automatic and the other non-automatic. Under these conditions the electro-responsive device still maintains the contacts 29 closed as the resistance of element 33 is less than the resistance of any three of the elements 34, 35, 36 or 37 and coil 31 thereby takes enough current to overcome coil 32. Under these conditions, if generator 2 is disconnected, bus section switch 14 is non-automatic and trouble on any of the feeders 10 allows their switches to open under the capacity of two generators, 3 and 4, as described whereas trouble on any of feeders 12 allows their switches to open on the capacity of generator 5. Similar operation would exist, if generator 5 was disconnected rendering bus section switch 15 non-automatic.

When, for any reason, two generators are not running their respective resistance elements are short-circuited and we have the condition in the electro-responsive device 22 when the resistance of the circuit of coil 31 is substantially equal to the resistance of the circuit including coil 32 as the resistance of element 33 is substantially equal to the resistance of two of the elements 34, 35, 36 or 37. Under this condition, the pulls exerted by the coils 31 and 32 are substantially equal and the bridging contact 30 is moved from engagement with contacts 29 by the biasing means or spring 42. When the electro-responsive device 22 opens its contacts 29 and 30 both section switches 14 and 15 are rendered non-automatic, and it is impossible to automatically close their control circuits. The electro-responsive device 22 thus serves to render the bus section switches 14 and 15 non-automatic when the generated capacity is within the safe rupturing capacity of the feeder switches. The feeder oil switches can safely open under the generating capacity of two generators and, therefore, with only two generators running there is no advantage in opening the section switches.

What I claim as new and desire to secure by Letters Patent of the United States, is:—

1. In combination with a supply conductor, a plurality of generators supplying said conductor, a plurality of feeders, switches connecting said feeders to said supply conductor, and a common means responsive to abnormal conditions on any of said feeders for causing that switch corresponding to the feeder at fault to open under a capacity which is less than the total capacity of said generators.

2. In combination with a supply conductor, a plurality of generators supplying said conductor, a plurality of feeders, switches connecting said feeders to said supply conductor, and a common means responsive to abnormal conditions on any of said feeders for preventing a portion of said generators from supplying said feeders and causing that switch corresponding to the faulty feeder to open under the capacity of only a portion of said generators.

3. In combination with a supply conductor, a plurality of generators supplying said conductor, a plurality of feeders, switches connecting said feeders to said supply conductor having a rupturing capacity less than the total capacity of said generators, and a common means operative in response to abnormal conditions on any of said feeders for reducing the generator capacity supplied to that switch corresponding to the faulty feeder to a value within its safe rupturing capacity.

4. In combination with a supply conductor, a plurality of feeders, switches connecting said feeders to said supply conductor, a plurality of generators supplying said conductor, a common means automatically operative in response to abnormal conditions on any of said feeders for reducing the energy supplied to said feeders to a predetermined amount, and independent means for subsequently causing the opening of the switch corresponding to the faulty feeder under said reduced energy.

5. In a system of electrical distribution, the combination with a supply conductor, a plurality of sources of electrical energy supplying said conductor, a plurality of feeders, switches connecting said feeders to said supply conductor, sectionalizing means included in said conductor and adapted to limit the energy supplied to said feeders, and a common means operative in response to a fault on any of said feeders for automatically operating said sectionalizing means.

6. The combination with a plurality of generators, a supply conductor to which said generators are connected, a plurality of feeders, switches connecting said feeders to said supply conductor, sectionalizing means operative to disconnect a portion of said generators from said feeders, a control circuit for said sectionalizing means, and a common means automatically operative to energize said control circuit in response to abnormal conditions on any of said feeders.

7. In a system of distribution comprising a bus bar, means for supplying said bus bar with a certain total amount of energy, a plurality of feeders, switches connecting said feeders to said bus bar and adapted to open under only a portion of the energy supplied to said feeders, and a common means responsive to abnormal conditions on any of said feeders for automatically reducing the energy supplied to the feeder at fault to a value within the safe rupturing capacity of its switch without discontinuing service on the remaining feeders.

8. In a system of distribution comprising a bus bar, means for supplying said bus bar with a certain total amount of energy, a plurality of feeders, switches connecting said feeders to said bus bar and adapted to be automatically opened in response to abnormal conditions on their respective feeders with a time delay, and a common means responsive to abnormal conditions on any of said feeders for instantaneously reducing the energy supplied to the feeder at fault to a value within the safe rupturing capacity of its switch without discontinuing service on the remaining feeder.

9. In a system of distribution the combination with a bus bar, a plurality of generators supplying said bus bar, a plurality of feeders, switches connecting said feeders to said bus bar having a rupturing capacity which is a fraction of the total capacity of said generators, sectionalizing means for said bus bar operative in response to abnormal conditions on any of said feeders to reduce the energy supplied to any feeder at fault to a value within its safe rupturing capacity, and means for rendering said sectionalizing means non-operative when the total capacity of said generators is within the safe rupturing capacity of said feeder switches.

10. In combination with a bus bar, a plurality of feeders, switches connecting said feeders to said bus bar, a plurality of generators supplying said bus bar, sectionalizing means operatively related to said generators and rendered automatically operative when the total energy supplied by said generators is greater than the safe rupturing capacity of said feeder switches and rendered non-operative when the total energy supplied by said generator is within the safe-rupturing capacity of said feeder switches.

11. In combination with a bus bar, a plurality of feeders, switches connecting said feeders to said bus bar, a plurality of generators supplying said feeders, sectionalizing means adapted when closed to supply said feeders with the full capacity of said generators and when opened to supply said feeders with the capacity of only a portion of said generators, means for rendering said sectionalizing means automatically operative in response to abnormal conditions on any of said feeders as long as the capacity which can be supplied to said feeders is greater than their rupturing capacity and non-automatic when the capacity which can be supplied to said feeders is within the safe rupturing capacity of said feeder switches.

12. In combination with a plurality of generators, a bus bar, switches connecting said generators to said bus bar, a plurality of feeders, switches connecting said feeders to said bus bar automatically operative with a time delay in response to abnormal conditions on their respective feeders, sectionalizing means included in said bus bar operative to disconnect a certain number of said generators from said feeders, a control circuit for said means, a relay responsive to abnormal conditions on any of said feeders for closing said control circuit, and an electro-responsive device for rendering said control circuit inoperative in response to the disconnection of a certain number of generators.

13. In combination a bus bar, a plurality of generators supplying said bus bar, a plurality of feeders, switches connecting said feeders to said bus bar, sectionalizing means for disconnecting one or more generators from said feeders, a control circuit for said sectionalizing means, means for closing said control circuit in response to abnormal conditions on any of said feeders, means for preventing the closure of said control circuit when a predetermined number of generators are disconnected from said bus bar, and means preventing the closure of said control circuit when certain generators are so disconnected.

14. In combination a bus bar a plurality of generators supplying said bus bar, a plurality of feeders, switches connecting said feeders to said bus bar, sectionalizing means for disconnecting one or more generators from said feeders, means normally rendering said sectionalizing means automatic when more than a certain number of generators are connected to said bus bar and for rendering said sectionalizing means non-operative when less than a certain number of generators are connected to said bus bar.

In witness whereof, I have hereunto set my hand this 2nd day of May, 1917.

DAVID BASCH.

Copies of this patent may be obtained for five cents each, by addressing the "Commissioner of Patents, Washington, D. C."